United States Patent [19]
Silversand

[11] Patent Number: 5,980,843
[45] Date of Patent: Nov. 9, 1999

[54] METHOD AND APPARATUS IN CATALYTIC REACTIONS

[75] Inventor: Fredrik Ahlström Silversand, Löddeköpinge, Sweden

[73] Assignee: Katator AB, Lund, Sweden

[21] Appl. No.: 08/983,008

[22] PCT Filed: May 24, 1996

[86] PCT No.: PCT/SE96/00675
  § 371 Date: Dec. 24, 1997
  § 102(e) Date: Dec. 24, 1997

[87] PCT Pub. No.: WO97/02092
  PCT Pub. Date: Jan. 23, 1997

[30] Foreign Application Priority Data

Jul. 5, 1995 [SE] Sweden ................................ 9502434

[51] Int. Cl.⁶ .............................. B01D 53/34; B05D 1/02; B01J 23/00; B01J 37/00
[52] U.S. Cl. .................. 423/210; 423/245.3; 423/246; 423/393; 502/300; 502/325; 502/506; 502/514; 502/527.15; 502/527.2
[58] Field of Search .................................. 502/300, 325, 502/506, 514, 527.15, 527.2; 423/245.3, 246, 393, 210; 264/44

[56] References Cited

U.S. PATENT DOCUMENTS

| | | | |
|---|---|---|---|
| 3,264,226 | 8/1966 | Johnson | 502/325 |
| 4,465,789 | 8/1984 | Lindsley | 502/255 |
| 5,061,464 | 10/1991 | Cordonna, Jr. et al. | 423/213.5 |
| 5,266,293 | 11/1993 | Fairey et al. | 423/403 |

FOREIGN PATENT DOCUMENTS

| | | | |
|---|---|---|---|
| 0 230 641 A1 | 8/1987 | European Pat. Off. | 502/527.2 |
| 3813312 A1 | 11/1989 | Germany. | |
| 55-132638 | 1/1980 | Japan. | |
| 55-73348 | 6/1980 | Japan | 502/527.2 |
| 55-132638 | 10/1980 | Japan. | |
| 56-108536 | 8/1981 | Japan. | |
| 58-017841 | 2/1983 | Japan. | |
| 5103987 | 4/1993 | Japan. | |
| 346 247 | 4/1931 | United Kingdom | 502/527.2 |
| WO 79/00247 | 5/1979 | WIPO. | |

Primary Examiner—Gary P. Straub
Assistant Examiner—Timothy C Vanoy
Attorney, Agent, or Firm—Mathews, Collins, Shepherd & Gould, P.A.

[57] ABSTRACT

A catalyzer is provided for promoting chemical reactions, such as the reaction between ammonia and air to produce nitrogen monoxide which, in turn, can be used to manufacture nitric acid or the purification of flue gas from incineration plants. The catalyzer is made by forming a mixture of a combustible pore forming substance, such as a polymer, vegetable material or graphite, and a ceramic material, such as alumina, zirconia, titanium dioxide, silica, tungsten carbides, silicon nitrides and mixtures thereof, and thermally spraying this mixture onto a support net to result in a net having porous ceramic deposited thereon. The surface area of this porous ceramic/net composition can be enlarged by depositing a high surface area ceramic, such as alumina, silica, titanium dioxide, zirconia, aluminum-titanium, silicon carbide and mixtures thereof, into the pores the ceramic/net composition by a in-situ precipitation technique; by a sol-gel technique or by injecting the high surface area ceramic into the jet spray of the ceramic material during the thermal spraying process so that both high surface area ceramic and ceramic material are deposited onto the net. Catalytically active metal components, such as palladium, platinum and oxides of iron, chromium, copper and zinc are deposited onto the resulting high surface area ceramic/net composition.

42 Claims, 8 Drawing Sheets

METHOD AND APPARATUS IN CATALYTIC REACTIONS

This application is a national stage filing under 35 U.S.C. 371 of PCT/SE96/00675 filed Jul. 9, 1997.

TECHNICAL FIELD OF THE INVENTION

The present invention concerns a method to purify flue gases originating in incineration plants. It also concerns a catalyzer device for the implementation of such purification. The invention allows for an efficient purification or cleaning of the flue gases with respect to both carbon monoxide and light and heavy hydrocarbons. The method and the device according to the invention can also be used for other chemical reactions.

Flue gases from certain types of incineration plants contain unsafe contents of pollutants which are hazardous to our health and environment, such as carbon monoxide (CO), light hydrocarbons (VOC) and heavy aromatic hydrocarbons, poly aromatic hydrocarbons (PAH). Among these pollutants, the PAH exhaust is considered to be the most serious ones since they may give rise to cancer. The VOC hydrocarbons, on the other hand, contain more substances capable of forming a photochemical smog and contributing to the greenhouse effect. The greatest problem occurs in small plants that fire with solid fuels and where system solutions and operation control are often inadequate. The emissions can also be high if the fuel is low quality or contains lots of water. Examples of such fuels can be sludge from treatment plants, food industry refuse, waste from paper and pulp industries, and mixtures of water and organic substances from the chemical industry. The harmful compounds are formed because the energy content of the fuel is so low that the combustion temperature becomes too low to perform complete combustion.

STATE OF THE ART

Before the arrival of this invention, purification of flue gases with regard to CO, VOC, and PAH preferably occurred with catalyzers. These were based on pellets, monoliths or fibers which had been coated with catalytically active components. It is true that these catalyzer solutions yield an acceptable degree of purification but they do have some serious, diverse drawbacks which have often prevented the application. Beds of both pellets and fibers render too high of a pressure drop in most applications. Additionally, in the case of pellets, the catalyzer efficiency becomes very poor since the main part of the catalyzer is inaccessible for pollutants and oxygen due to diffusion effects during combustion. Monoliths are honeycomb-like structures with thousands of channels. Such structures are expensive, hard to clean of deposits (soot and ashes) and may crack during transient temperature intervals due to thermally induced tensions in the material.

By providing a net structure with a ceramic layer its activity can be increased to a considerable extent at the same time as consumption of precious metals can be reduced. Tests have therefore been conducted in which standard steel wire nets were submersed into suspensions of ceramic particles (slip casting) having high specific surface. Through a drying and calcination process it has become possible to make the ceramic layer adhere to the metal wires of the net, resulting in a ceramic layer of high specific surface. This layer has then been provided with an active material in a conventional impregnation process. Catalyzer designs of this type have been used to purify exhausts of hydrocarbons of different types and the result has been satisfactory. The existing problem is that the adhesion of the ceramic wash coat to the metal wires is inadequate, causing certain parts of the wash coat to gradually loosen. This process of disintegration is much more pronounced in net structures than in monoliths, because net structures are characterised by an inherent mobility and can made to vibrate by thrusts in the flow direction. In purifying dust-containing gases it is also essential that the net can be subject to mechanical cleaning through brushing or similar and that this is done with certain regularity. The wash coat might be loosely attached to the metal wires causing the layer, wholly or partially, to loosen from the net structure and, if this is the case, the catalyzer will lose its activity.

SUMMARY OF THE INVENTION

Through studies of methods for thermal forming by spraying (flame spraying, air plasma spraying, high velocity spraying, detonation spraying, corona brushing, protective gas plasma spraying, vacuum plasma spraying, and laser based methods for surface coating) it has quite unexpectedly become possible to manufacture net-based porous ceramic catalyzers, which can be used to purify flue gases with regard to CO, VOC, and PAH. The present invention comprises a novel method of manufacturing net-based ceramic catalyzers and a way to utilize such catalyzers to purify flue gases. The invention allows for an efficient cleaning of CO, VOC and PAH at a temperature in the range of 200–1000° C. The invention consists of a high temperature stable net structure, which is preferably metal-based and has been coated with a porous ceramic layer through some type of a thermal spray-forming process, preferably a flame or air plasma spraying process.

The net structure can be a net or a disc equipped with multiple openings. The net or disc may be of a planar or cylindrical design, or of another design causing the exhaust to pass through or by the net structure. A design in the form of a disc of expanded metal may be mentioned as yet another alternative. The ceramic layer may consist of numerous materials, but preferably of zirconia or alumina. In order to achieve an enhanced and well-defined pore structure, admixture of combustible components occur (for example polymer and vegetable materials) in the initial ceramic material used for the forming process by spraying. Upon spray-forming, combustion takes place of the combustible component of the two-phase layer, whereby a well-defined pore structure is created. By precipitating a ceramic material in the porous, spray-formed layer a significant enlargement of the ceramic layer specific surface ($m^2/g$ of ceramic material) is obtained, and which is required so that adequate and sufficient catalytic activity can be achieved. The precipitated ceramic phase may consist of several different materials, but preferably it consists of alumina, silica, titanium dioxide, zirconia or mixtures of these. The surface area enlarging layer can also be applied as a wash coat on top of the layer formed by spraying. The uneven surface structure of the spray-formed layer hereby constitutes an effective base for the wash coat, which can be applied through a slip casting process. Specific surface can also be increased to a large extent by depositing a ceramic powder into the particle jet originating from the thermal spray-forming equipment. The requirement for this is that the deposited ceramic powder has high specific surface and that depositing occurs in immediate vicinity to the substrate surface. Thereby, no significant heating of the deposited powder is effected, thus eliminating sintering processes which would cause a decrease in specific surface. The ceramic layer is produced according to method 1) direct spraying+secondary surface area enlargement through precipitation, or method 2) spraying with simultaneous depositing of ceramic powder, or a combination of methods 1) and 2) followed by coating with a catalytically active material through an impregnation process. During impregnation the ceramic layer pore structure is saturated with a solution containing the active component, which may include precious metals, transition metals or combinations of these. Upon the step of impregnation, the net structure is dried, and heating then takes place in an oxidizing or reducing environment.

The present invention warrants a number of advantages compared to existing catalyzer devices. No 1, catalyzer efficiency becomes extremely good because of the macroporosity of the thin cylinder-shaped ceramic layer permitting an effective transport of molecules to the catalytically active sites. No. 2, net structures mounted in series give rise to an increased turbulence, which improves the mass and heat transfer factors resulting in an increased catalyzer efficiency. No. 3, the open structure of the catalyzer design causes a negligible pressure drop. No. 4, the catalyzer surfaces are easy to access for mechanical cleaning with respect to deposited particles, such as soot and ashes. No. 5, the module-based catalyzer assembly provides for unique possibilities of adaptation or modification. The invention is based upon the knowledge that different pollutants require different active materials for purification. By placing nets of different coating in series, the flue gases can be cleaned of a great number of different pollutants simultaneously. Furthermore, net-based structures can be much more readily conformed to different geometrical needs (geometries and dimensions). No. 6, different catalyzer nets can be changed separately if deactivation has occurred only in one or some of the nets. No. 7, the module-based structural assembly of the catalyzer allows for a simplified manufacturing process and provides for effective recycling of the catalyzer.

There is a great number of applications for the present invention. Catalytically active net structures based on the description above are applicable to catalyzing fast reactions. Examples of such reactions are the following:

Purification of exhaust and flue gases with regard to carbon monoxide and hydrocarbons Catalytic combustion of gaseous fuels for energy production Catalytic purification of ventilating air with regard to solvent fumes Catalytic purification of gases with regard to malodorous compounds Two- and three-way catalysis in automotive applications Production of nitric acid by oxidizing ammonia Production of ethylene oxide by oxidizing ethylene Production of hydrogen cyanide through the reaction between methane, ammonia, and oxygen Production of aldehydes through partial oxidation of alcohols Steam reforming of hydrocarbons Catalysis of the water gas reaction Methanizing The invention can be utilized for purifying exhaust and flue gases from various types of incineration plants with regard to carbon monoxide and hydrocarbons. In these applications the less clean gas is conducted at a minimum temperature of 200° C. through one or several catalytic nets which are mounted in series one after the other. The nets may be given an optional geometric design and, for instance, be shaped as plates, discs, or cylinders. Preferably precious metals are used as the catalytically active material, or precious metals in combination with one or more metal oxides. During oxidation, the oxygen extant in the exhaust or flue gas is normally used. If the oxygen content is too low, secondary air is supplied into the gas stream not yet purified before the catalyzer.

In certain cases the interest is focused on burning of gas mixtures that contain large amounts of combustible compounds, such as natural gas or liquified petroleum-gas, the purpose of which is to generate thermal energy. In this application it is essential to design the catalyzer in such a way that maximum cooling through radiation can be achieved. Thereby, heating of the catalyzer is avoided, which otherwise would ruin the catalyzer. The flexibility of the net structure as well as its open structure enable effective cooling through thermal radiation, provided that the catalyzer is surrounded by cold surfaces which function as depressions for the thermal radiation. In this application, it is preferable that palladium is used as the active material because of the proven high temperature stability of this metal. The temperature level in the net is between 600 and 1100° C. during operation, and preferably between 700 and 900° C.

Some industries let out considerable amounts of solvents into the ventilation air. Catalytic nets can be used to purify the ventilation air from such compounds. The solvent-containing gas is then conducted through a number of nets at a temperature above 200° C. Depending upon the unique flexibility of the net catalyzer, it can be readily adapted to comply with various space limitations and other construction requirements. Precious metals are preferably used as the active material.

Odoriferous substances may cause apparent problems in the environment surrounding certain industries, for example the food industry. The odoriferous substances can often be relegated to the following groups: amines, mercaptans, or terpenes. The malodorous problems can be lessened to a large extent by conducting the air mingled with odoriferous substances through one or several catalytic nets at a temperature exceeding 200° C. To this end, precious metals and/or metal oxides are used as the active material. In certain instances, nets are used in which zeolites are built in, in the spray-formed layer through the depositing technique described in this patent.

The nets according to the invention may also be utilized in automotive applications, both for 2-way catalysis (purification with respect to carbon monoxide and hydrocarbons) and for 3-way catalysis (purification with respect to carbon monoxide, hydrocarbons, and nitrogen oxides). In the first-mentioned case, the oxygen content of the exhaust is so high (two-cycle engines or diesel engines) that the pollutants are burned off under the influence of oxygen across a net catalyzer, which preferably contains precious metals. In the last-mentioned case, combustion is controlled in such a way that all oxygen is normally consumed (four-cycle engines equipped with a lambda probe). It is thereby possible to achieve a reaction between nitrogen oxides (oxidizing agent), carbon monoxide and hydrocarbons (reducing agent) at a minimum temperature of 200° C. Precious metals, most advantageously a mixture of platinum and rhodium, are used as catalytically active material. The nets are designed in such a manner that the pressure drop is limited to the extent possible, which involves a small number of nets mounted in series with a relatively large cross-section of flow. The net structures are preferably given a cylindrical design such that the exhaust is conducted radially through the net structure.

By conducting a mixture of ammonia and air through a number of catalytic nets coated with precious metals, nitrogen monoxide is yielded which can then be further oxidized and dissolved in water, thus forming nitric acid. The catalyzer consists of a number of catalytic nets, which are placed in series on top of each other, and the gas mixture is conducted through the net package at a minimum temperature of 700° C. Before the advent of this invention, precious metal nets were used (often platinum and rhodium) woven of homogenous metal wire. Such nets are much more expensive than the nets according to the invention. By the same token, the nets according to the invention provide for a stabilizing influence on the precious metals such that the loss of precious metal through evaporation can be reduced.

Production of hydrogen cyanide is conducted in a way similar to the production of nitric acid, the difference being that methane is also included in the reactant stream.

If a gas mixture, which contains ethene in air, is brought into contact at 250–300° C. with a net catalyzer containing silver, ethylene oxide is yielded. To enhance selectivity for ethylene production, small amounts (a few ppm) of ethylene dichloride are added to the gas stream.

Examples of production of aldehydes can be derived from the production of formalin. In this process a gas mixture of methanol and air is brought into contact with a net catalyzer containing silver (a high methanol concentration) or ferrous molybdates (a low methanol concentration). Today, in some industrial processes homogenous metal nets of silver are used. These are much more costly than the nets according to this invention. The temperature is normally between 350 and 400° C. in the ferrous molybdate process and slightly higher in the case of silver.

The net catalyzers, which are coated with appropriate metals/metal oxides, can also be used during steam reforming and related reactions, which are important in the petrochemical industry and in synthetic gas related processes. During steam reforming, precious metals and/or nickel are preferably used as the active material, and a gas mixture containing steam and hydrocarbons is conducted through the package of catalytic nets at a temperature in the 400–900° C. range. The composition of the product gas is dependent on the reaction temperature, whereby the hydrogen and carbon monoxide proportions increase monotonously with the temperature. The water gas reaction can be catalyzed with nets containing oxides of iron, chromium, copper and zinc, and is generally utilized to adjust the ration between carbon monoxide and hydrogen after the completion of the steam reforming step.

Besides usage as described in the above examples, the nets according to the invention can also be used in a number of other important industrial processes, in which the course of reaction is fast and characterised by extensive mass transport limitations.

The invention comprises the use of ceramically coated net structures for the implementation of catalytic reactions, such as flue gas purification and chemical synthesis, and the methodology to manufacture such catalytically active nets through a modified thermal forming process by spraying. The modification is based on the knowledge that the pore structure and specific surface of the ceramic layer are influential on the catalyzer activity. The modification consists of two alternative methods for increasing pore volume and specific surface of the ceramic layer, and which can each be used separately or in combination. In the one method a well-defined pore structure is created by including a pore-creating, combustible material in the initial ceramic material during the spraying process. The pore structure is developed through combustion of the combustible component, and it can then be surface area enlarged through a precipitation technique. In the second method, a ceramic powder with high specific surface is deposited in the particle jet originating from the spray equipment. The ceramic layer, therefore, will contain particles of high specific surface. In both methods, coating of active material occurs through an impregnation technique.

The characteristics of this invention are accounted for by multiple examples and a number of drawing figures as follows:

EXAMPLE 1 Increase of the pore volume by utilizing pore-forming combustible components of the spray material.

EXAMPLE 2 Increase in specific surface by depositing a ceramic powder into the particle jet originating from the spray equipment.

EXAMPLE 3 Combustion of CO and methane in the monolithic catalyzer; an example of reference.

EXAMPLE 4 Net wire mesh effect during combustion of CO and methane.

EXAMPLE 5 Effect of number of nets during combustion of CO and methane.

EXAMPLE 6 Flow load effect during combustion of CO and methane.

EXAMPLE 7 Comparison of various methods for surface enlargement of the catalyzer during combustion of CO.

EXAMPLE 8 Effect of degree of coating of the active material during combustion of CO.

EXAMPLE 9 Cleaning of the flue gases from small-scale combustion of biofuels in a fluidized bed.

DESCRIPTION

Theoretical considerations and practical experiments have proven that the ceramic layer should have a pronounced macroporosity and high specific surface. This objective is achieved when the catalyzer is manufactured in accord with the above description. The thickness of the ceramic layer should be somewhere in the range of 0.1–0.8 mm, preferably in the 0.2–0.5 mm range. The net's wire mesh also plays a significant role for the efficiency of the catalyzer. An increased wire mesh results in an increased degree of purification, but also causes an increased pressure drop and greater risks for gobbing or clogging if the flue gases are mingled with particles. The surveys show that the wire mesh should be in the range of 1,6–9,5 meshes per cm (4–24 meshes per inch, Tayler mesh scale), and preferably in the range of 3,1–6,3 meshes per cm (8–16 meshes per inch). The degree of purification or cleaning is also affected by the number of nets placed one after the other. Test trials have shown that the number of nets should be in the interval of 1–10 nets positioned in series, and preferably in the 3–7 interval. The flow load as well has a significant effect on the degree of purification because an increased flow velocity will result in a reduced time of contact between the gas and the catalyzer. For high degrees of purification, the combustion reactions are in general completely mass transport limited, causing the flow effect to be slightly weaker. In this so called mass transport dominated area, it is true that an increased flow velocity will lead to reduced time of contact between gas and catalyzer, but at the same time the mass transfer factor will increase due to elevated turbulence. Computations and practical tests have proven that flow load calculated per square meter of net structure in the flow direction should be in the interval of 100–1000 $m^3/h$, $m^2$ (NTP), preferably in the interval of 100–600 $m^3/h$, $m^2$ (NTP).

Figure 1:
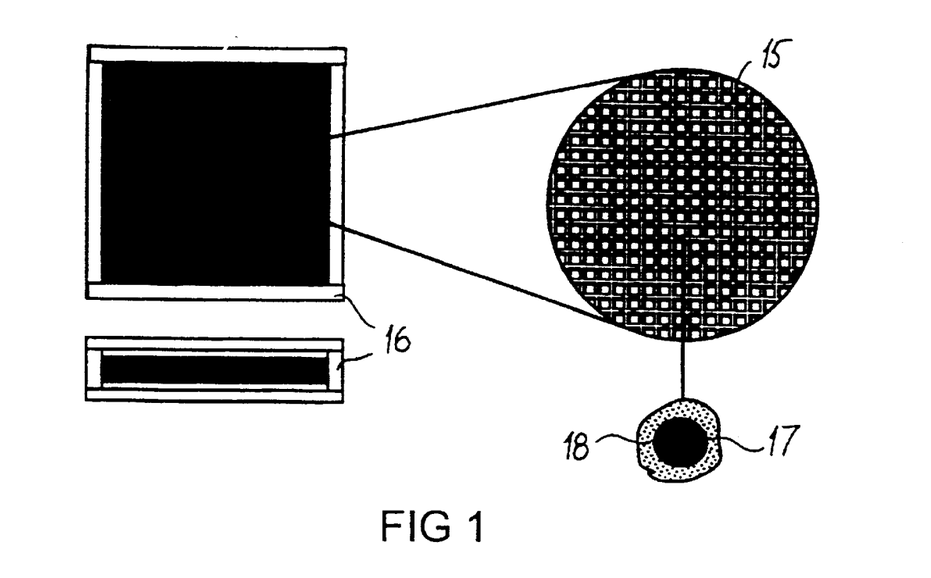
FIG. 1 shows the appearance of the catalyzer and the cross-section of a thermally formed metal wire.

In the design as per FIG. 1 three catalytic nets 15 have been placed in a rectangular net holder 16. The Figure also shows an enlargement of the net. It also shows a cross-sectional view of an enlarged wire 17 of the net. The wire is provided with a layer 18 of porous ceramic material. This layer 18 has been formed by thermal spraying in accordance with an embodiment of the invention.

Figure 2:
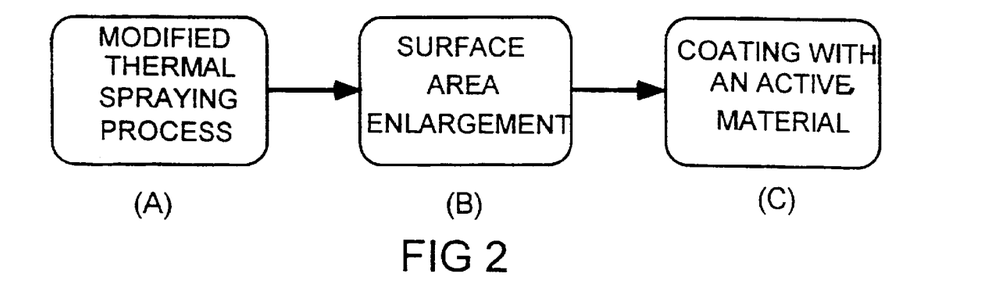
FIG. 2 illustrates an overview block diagram of the manufacturing process.

FIG. 2 shows an overview block diagram illustrating three steps for the manufacture of a catalyzer. In the first step (a) the net structure is coated with a ceramic material by means of a modified thermal spraying process. In the second step (b) the porous ceramic material is surface area enlarged by depositing ceramic material into the pores of the layer formed by spraying. Depositing may for instance be carried out by using sol/gel technology or by use of an in-situ precipitation procedure. Finally, in step (c), the surface-enlarged ceramic layer is coated with an active material through a conventional impregnation procedure.

Figure 3:
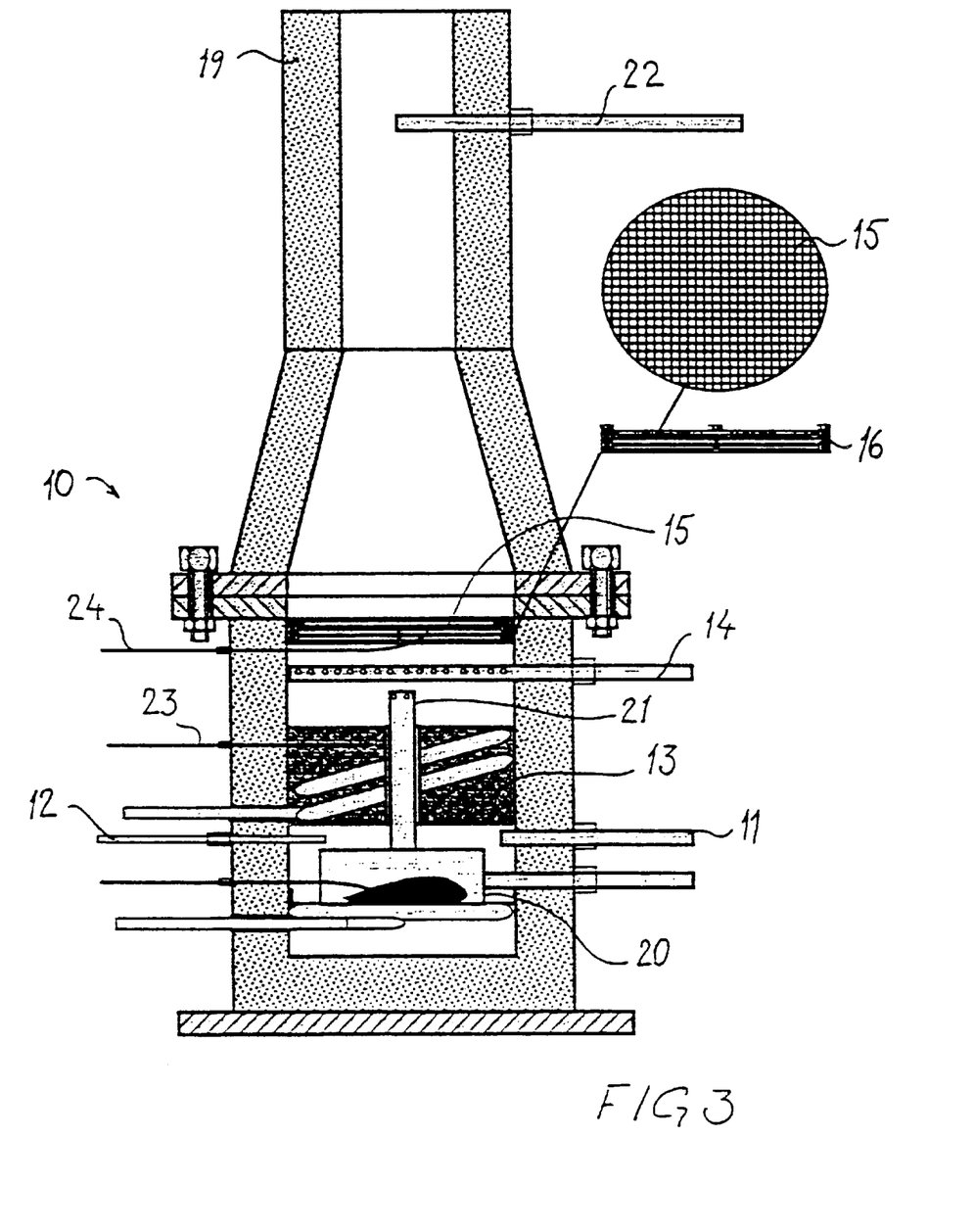
FIG. 3 is a schematic cross-sectional view of a used trial equipment.

The tests regarding catalytic activity were implemented in a specially constructed reactor 10, see FIG. 3. The reactor allows for simulation of the conditions in a wide variety of combustion or incineration plants. An appropriate gas mixture containing nitrogen, oxygen, carbon dioxide is conducted into a gas inlet 11. Water is supplied through an inlet 12, fed in proportionally in its liquid state, and evaporated within the reactor. The resultant mixture of gas and water steam is then passed through a heat zone 13, where the temperature of the gas mixture can vary in the range of 20–700° C. After the heat zone, different contaminant gases can be supplied to the gas stream through a distribution pipe 14. The resultant gas mixture is then conducted into contact with the catalyzer nets 15 received by rectangular net holder 16 and then out through a flue gas pipe 19, in which there is mounted a sampling tube 22. The temperature is measured in the heat zone with a first thermocouple 23, in the catalyzer bed with a second thermocouple 24 and also at a location after the bed. It is also feasible to pyrolyze various solid fuels and supply the pyrolytic gases to the gas stream. In such a case the solid material is placed in a pyrolysis receptacle 20, which is heated in a special fashion. The pyrolytic gases thus formed are transported through the heat zone in a separate pipe so as to avoid breakdown/combustion of sensitive macromolecules. The pyrolysis may occur in different atmospheres: reducing, neutral, or oxidizing. The activity during combustion of carbon monoxide and methane is examined in the standardized combustion tests of the Examples of embodiments that follow below. While carbon monoxide is an impurity which rather easily undergoes combustion in this context, methane most likely constitutes one of the hardest impurities to burn off catalytically due to its inherent stability.

Measurements concerning specific surface were implemented in accord with the BET method (one-point measurement, MicroMeritics FlowSorb II). The total pore volume was determined through utilization of penetration liquids.

Figure 4:
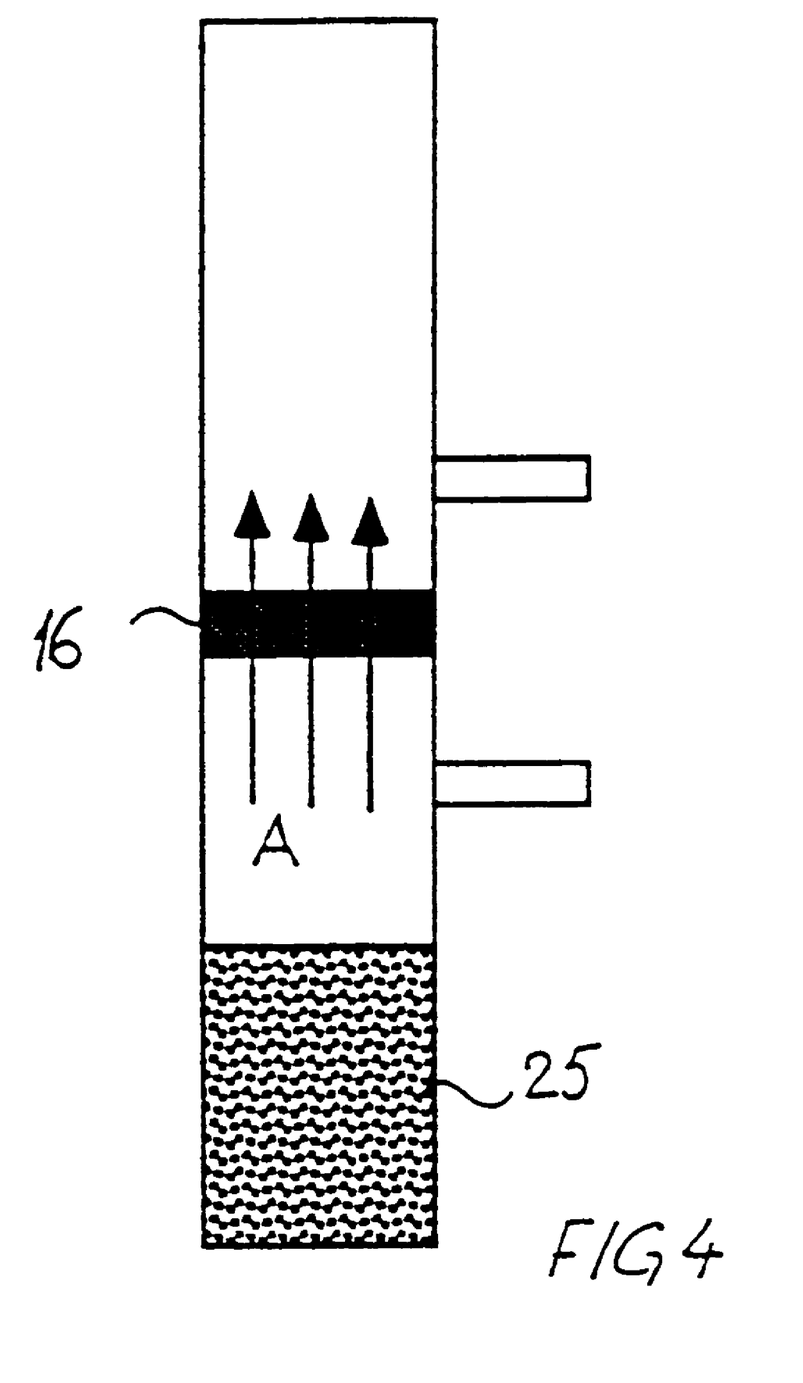
FIG. 4 shows a cross-sectional view of an equipment used for implementation of flue gas cleaning in a fluid bed reactor.

Tests regarding purification of flue gases from combustion of biofuels in a fluidized bed were carried out in a pilot device of power class 20–40 kW, see FIG. 4. Flue gases are conducted from the fluidized bed 25 through the reactor in the direction A of the arrows. There is provided a net holder 16 with catalytic nets in the reactor. The flue gas composition is analyzed before and after the catalyzer unit.

EXAMPLE 1

Figure 5:
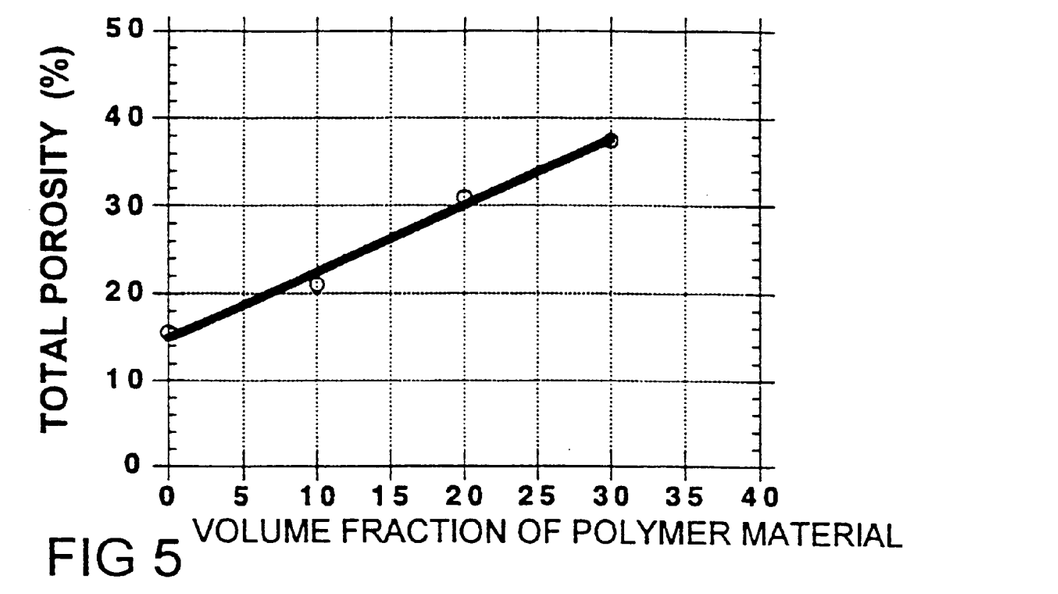
FIG. 5 represents a diagram illustrating the total porosity as a junction of the volume fraction of pore-forming polymer material.

In this example a steel wire net is coated with a ceramic layer by flame spraying (oxygen-acetylene flame) with alumina powder (powder feed of 55 g/min). In order to study the effect of adding pore-forming components, combustible amide resin was supplied to the alumina powder in the volume proportion of 0–30% by volume. For additions exceeding 35% by volume, adhesion was inadequate between the substrate surface and the spray-formed layer. In FIG. 5, there is shown a diagram of the total pore volume as a function of the amount of pore-forming material. As is shown by the Figure, the total pore volume (determined by the use of penetration liquid) increases in a fashion virtually linear to the amount of pore-forming material in the interval examined. The test shows that it is possible to increase the porosity of a thermally spray-formed layer through utilization of pore-forming additive materials.

EXAMPLE 2

Figure 6:
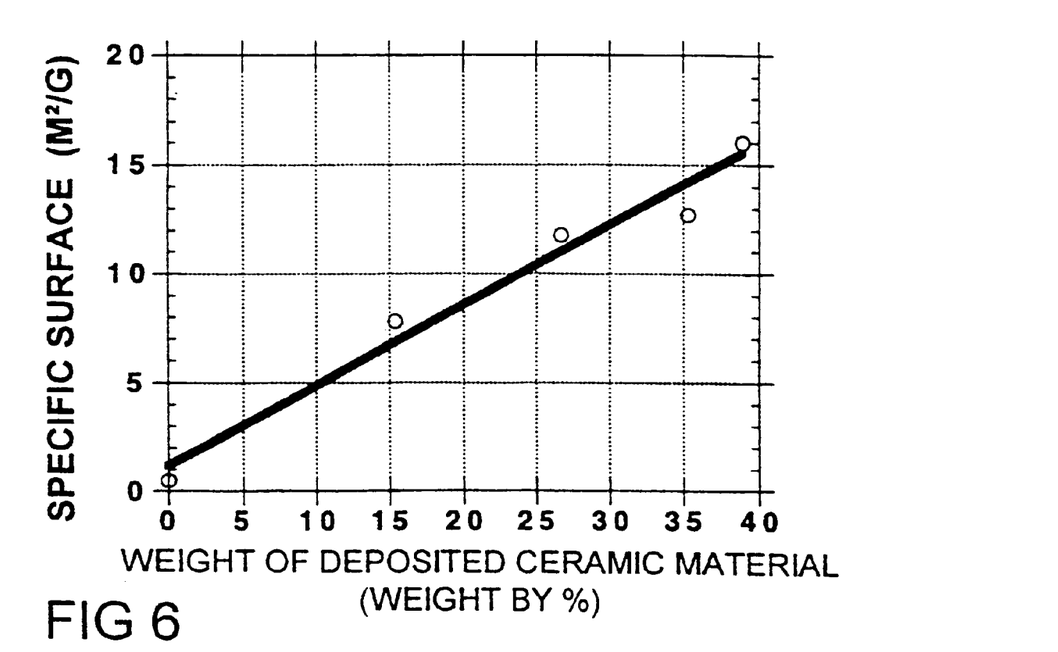
FIG. 6 represents a diagram illustrating specific surface as a function of the part by weight of deposited ceramics.

In this example flame spraying (oxygen-acetylene flame) was carried out with alumina powder (powder feed of 55 g/min). The alumina with high specific surface (ProCatalyse©, Spheralite© 509D, a specific surface of 326 m2/g, a particle size of 50–60 microns) was deposited into the particle jet right in front of the substrate surface. Hereby, ceramic particles having high specific surface were incorporated in the spray-formed layer, thus imparting increased specific surface to the ceramic layer. In FIG. 6, there is shown a diagram wherein the amount of ceramic material deposited is varied from 0 to 40% by weight. As is obvious from the Figure, specific surface (measured with an areameter, MicroMeretics©) is increased linear to the amount of weight of the deposited ceramic material. In case of a weight amount of 40% of deposited material, specific surface for the ceramic layer is 16 m$^2$/g, which is sufficient in the applications concerned. The test shows that it is feasible to increase specific surface of the spray-formed layer by depositing a ceramic powder of high specific surface into the particle jet during spraying.

EXAMPLE 3

Figure 7:
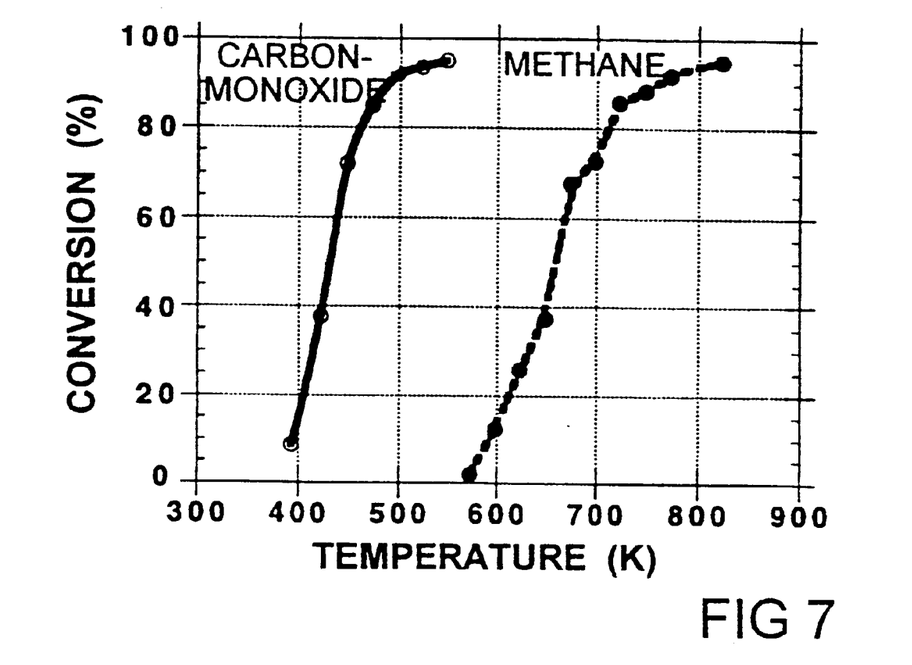
FIG. 7 represents a diagram illustrating the conversion of carbon monoxide and methane over a monolithic catalyzer of previously known type.

To be able to assess the potential of the present invention, a combustion test was conducted with a catalytic monolith. The monolith was placed in the test equipment in a position where the catalytic nets are normally found. The diameter of the monolith was initially 150 mm, but in order for it to fit in the equipment a cylinder having a diameter of 100 mm was sawed out. The original monolith was designed to purify flue gases from a wood stove having a power range of 10–20 kW. A gas mixture of 2500 ppm of carbon monoxide and methane in air was conducted through the monolith at a flow of 40 l/min. The temperature was raised incrementally from 120° C. to 550° C. It is clear from FIG. 7 that the conversion of carbon monoxide increases from a low 10% at 120° C. to above 95% at nearly 300° C. The conversion graph also clearly shows that the combustion reaction is mass transport limited at temperature levels above approximately 200° C. Methane, on the other hand, requires a substantially higher temperature for combustion than carbon monoxide. The conversion increases from approximately 2% at 300° C. to over 90% at a temperature level of over 500° C. Similar to the case with combustion of carbon monoxide, the combustion reaction is mass transport limited at high temperatures (in this case at a temperature exceeding approximately 400° C.). While the cross-sectional surface of the monolith is reduced by a factor of 2 during this test, it is still quite over-sized for the flow which for practical reasons was used in the test equipment. In a real application the gas flow through a monolith of the present size is between 75 and 150 l/min, which means that the dwell time in the catalyzer is reduced by a factor of 2. It is important to consider this fact in the following tests with catalytically active nets.

EXAMPLE 4

In this series of tests a number of nets of various wire mesh was coated with a ceramic material (zirconia stabilized with yttrium oxide) by the use of flame spraying. The tests included nets with 1,6, 3,1, 6,3 and 9,5 meshes per cm (8, 12, 16 and 20 meshes per inch), respectively. Table 1 accounts for some relevant data regarding the nets.

TABLE 1

| Wire mesh (meshes/cm)(inch) | Wire diameter (mm) | Ceramic Layer thickness (mm) | Catalyst amount/ net (g) |
|---|---|---|---|
| 3.1 (8) | 0.9 | 0.15 | 7.3 |
| 4.7 (12) | 0.7 | 0.038 | 2.2 |
| 6.3 (16) | 0.6 | 0.039 | 2.5 |
| 7.9 (20) | 0.5 | 0.085 | 5.8 |

TABLE 1-continued

As is obvious from the Table, the thickness of the ceramic layer varies and causes repercussions to the conversions obtained in the kinetically defined area. In the mass transport defined area, the ceramic layer thickness (catalyst amount) is insignificant. Specific surface of the ceramic layer was low and amounted only to 1.3 m$^2$/g. A relatively low catalytic activity is therefore to be expected in this case. The nets were impregnated with a solution containing 0.75 mol/l of PD and 0.25 mol/l of Pt. Upon impregnation the nets were dried at 150° C. for 1 hour and were reduced at 800° C. (in hydrogen gas) for 3 hours. During the combustion tests two nets were positioned in series in the catalyzer holder, and air containing 2500 ppm of carbon monoxide and methane was conducted the holder at a flow of 40 l/min. the temperature was varied in the range of 120° C.–600° C. According to FIG. 8, a substantial increase of carbon monoxide conversion occurs in the temperature interval of 150–200° C. for all of the nets. In the cases of 3,1 and 4,7 meshes per cm (8 and 12 meshes per inch), the mass transport defined area is reached at slightly over 200° C., whereas the net with 6,3 meshes per cm (16 meshes per inch) approaches the area defined by mass transport at 250° C. The highest density net, 7,9 meshes per cm (20 meshes per inch) is still at 250° C. in the kinetic area, which is obvious from the strong temperature dependence of that conversion. The catalyzer has a low activity, which is very obvious referring to the conversion curves for methane. The conversion increases only slowly in the 400–600° C. range for all of the nets. Similar to the case with carbon monoxide combustion, increased wire mesh also renders an augmented conversion. The test series shows that an increased net wire mesh leads to an increased conversion in the mass transport defined area. The reason therefore is that an increased net wire mesh provides a greater contact surface between gas and catalyzer, which is favorable to mass transport.

EXAMPLE 5

Figure 9:
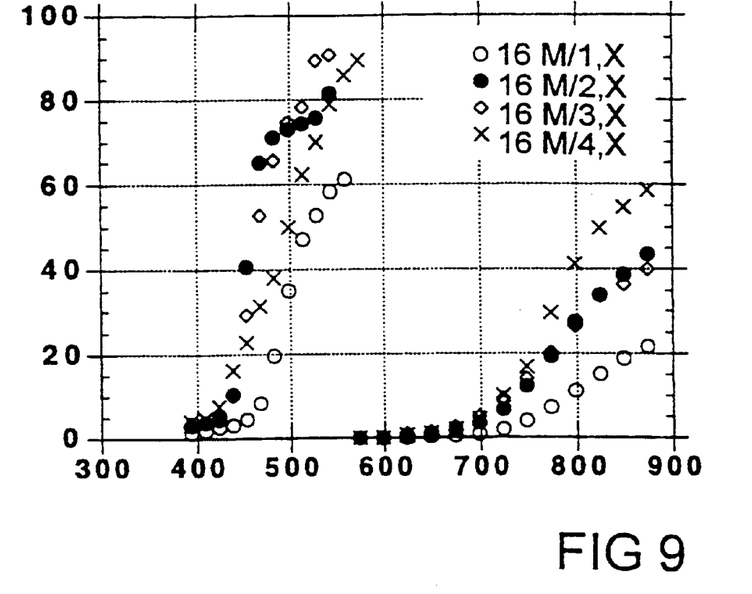
FIG. 9 represents a diagram illustrating the conversion of carbon monoxide and methane when the number of nets is varied between 1 and 4.

This Example was carried out in a way similar to EXAMPLE 4, the exception being that the number of nets was varied instead of varying the net wire mesh. The effect of the number of nets was studied by positioning 1–4 nets having a wire mesh of 6,3 meshes per cm (16 meshes per inch) in series in the test equipment. The combustion test was carried out in the same manner as in EXAMPLE 4. The test results are presented in FIG. 9. It is clear that the conversion is strongly dependent on the number of nets that are placed in series. When the number of nets was increased from 1 to 4, there was an increase of carbon monoxide conversion from 60 to over 90% in the mass transport controlled area. Correspondingly, the conversion of methane increases from 30% to near 60% at 600° C., when the number of nets is increased from 1 to 4. The test shows that it is possible to increase the degree of purification considerably by placing multiple catalytically active nets in series.

EXAMPLE 6

Figure 8:
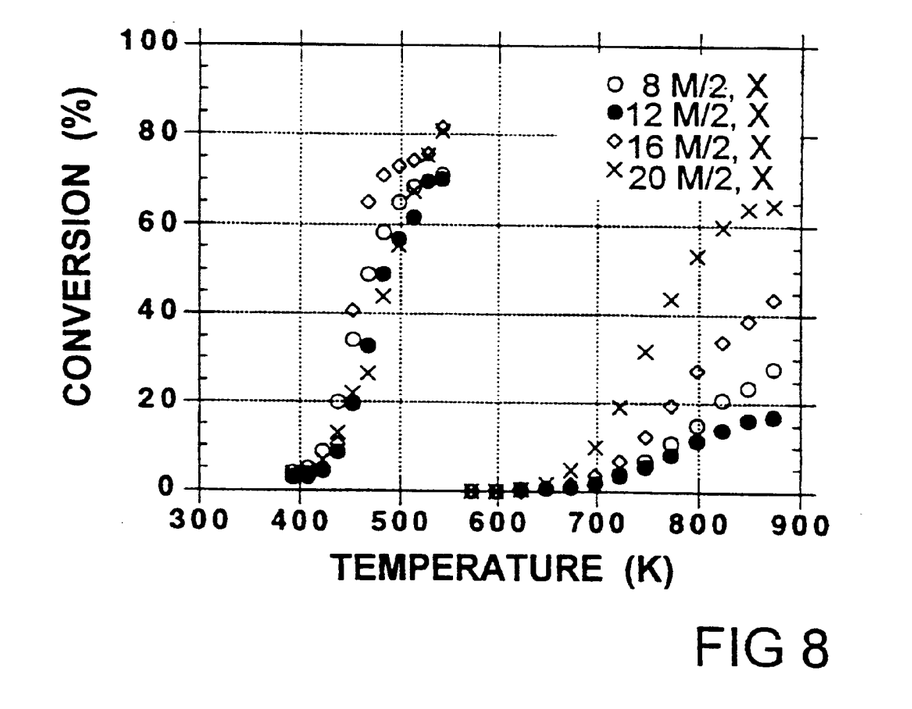
FIG. 8 represents a diagram illustrating the conversion of carbon monoxide and methane when the net wire mesh is varied between 8 and 20 meshes per inch.
Figure 10:
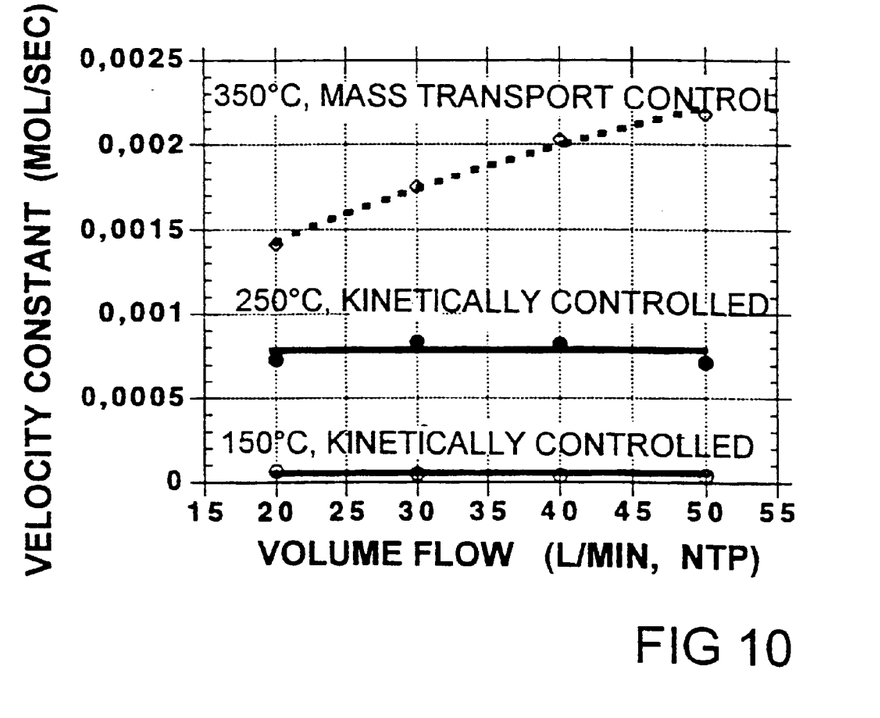
FIG. 10 represents a diagram illustrating the velocity constant as a function of the volume flow at different temperatures during combustion of carbon monoxide.

In this Example, the flow load was varied at a number of different temperatures during combustion of carbon monoxide and methane. The test utilized two catalytically active nets according to EXAMPLE 5 having a net wire mesh of 6,3 meshes per cm (16 meshes per inch). The rates of reaction (mo/sec) were calculated from the integral conversion results, whereupon the rate of reaction was set against the flow load. See FIG. 10 in which the rate of reaction was set against the volume flow during combustion of carbon monoxide. If the reaction is completely kinetically controlled, the rate of reaction is independent of the flow load. In the area completely dominated by mass transport there is, on the other hand, achieved a dependence between the rate of reaction and the flow load. It is shown by FIG. 8 that the carbon monoxide combustion is kinetically controlled at the two lower temperatures but mass transport controlled at the highest temperature. In the case of methane combustion, there is kinetic control in an equivalent way at all temperatures within the interval of 400–600° C. The Example shows that the conversion (especially in methane combustion) can be increased to a considerable extent if the catalyzer activity can be increased. In the following examples, various methods are described for the implementation of such an activity increase.

EXAMPLE 7

In this Example, a steel wire net with a wire mesh of 6,3 meshes per cm (16 meshes per inch) was coated with a 0.2 mm thick layer of alumina. For the flame spraying procedure there was used a mixture of alumina powder and polyamide having a mixture ratio of 80:20% by volume. Through combustion of the polyamide at 800° C. in air there was developed a well-defined macroporosity in the spray-formed layer. The total hollow fraction of the ceramic layer amounted to about 30% by volume. Using the ceramically coated net above as a starting-point, catalytically active nets were manufactured in accord with the following procedures:

1) Direct impregnation of nets using a palladium solution.

2) Impregnation of nets using the palladium solution. Prior to impregnation the nets are provided with a wash coat (20 micron thick) of Spheralite© 531P3 (ProCatalyse©, a specific surface of 115 m²/g, a particle size of 8–12 micron, 2% by weight of $La_2O_3/Nd_2O_3$ on $Al_2O_3$) through a slip casting process.

3) Impregnation of nets using the palladium solution. Prior to impregnation the nets have been provided with surface area enlarging material through a repeated treatment of the ceramic layer using a alumina-sol solution (Nyacol Colloidal© sol, 20% by weight of $Al_2O_3$, a particle size of 50 nm).

4) Impregnation of nets using the palladium solution. Prior to impregnation the nets have been provided with a surface area enlarging layer through precipitation of alumina by means of an in-situ process (the pore structure is saturated with a solution of aluminum ions, which is made alkaline. The aluminum hydroxide precipitates and is transformed to γ-alumina through calcination).

Figure 11:
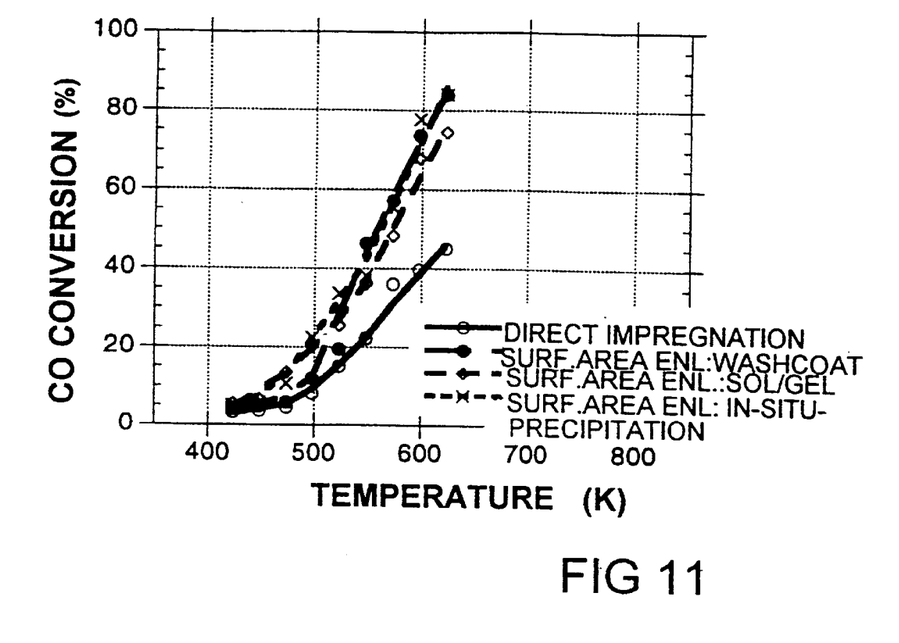
FIG. 11 represents a diagram illustrating the conversion during combustion of carbon monoxide as a function of temperature during use of various types of catalytic nets.

All of the nets were saturated with a 1 mol/l solution of dissolved palladium. Upon impregnation, reduction occurred (800° C. in hydrogen gas during 3 hours) as well as oxidation (800° C. in air during 3 hours). During testing two identical nets of the respective type (1–4) were used, mounted in series. The flow load during testing amounted in this case to 900 m³/h, m², which is 2.5 higher than in the Examples 4 and 5. In FIG. 11, the results from the activity measurements are displayed. It is obvious from FIG. 11 that the surface area enlargement makes it possible to increase the activity to a considerable extent. This Example shows how it is feasible to increase the activity in porous ceramic net structures through surface area enlargement, and to do so in a relatively easy fashion and in a number of different ways.

EXAMPLE 8

Figure 12:
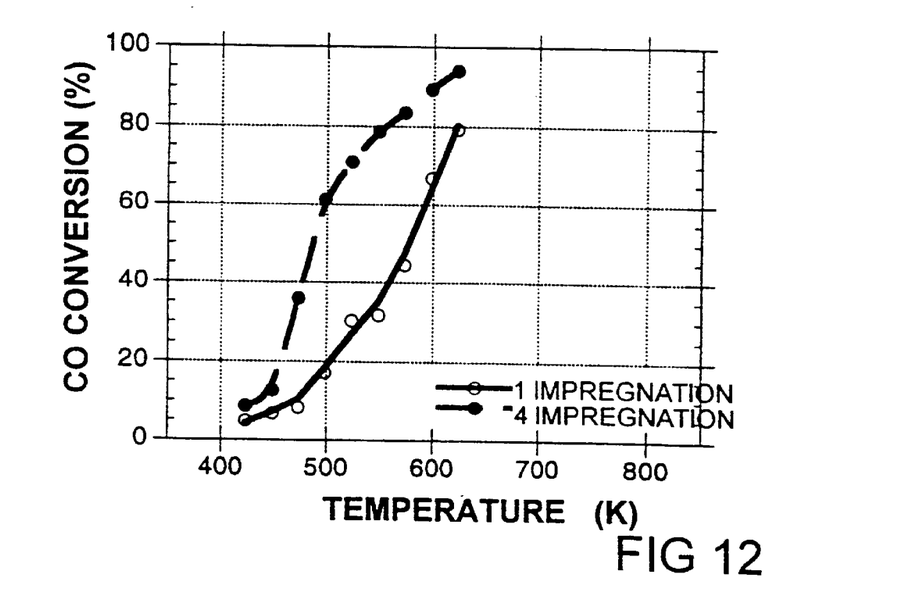
FIG. 12 represents a diagram illustrating the conversion during combustion of carbon monoxide as a function of temperature for one and four impregnations, respectively, of the catalytic net.

In this Example, procedure alternative 3 according to Example 7 was coated with different contents of an active material. The coating took place through a repeated impregnation of the layers pore structure with a solution of 1 mol/l palladium in a dissolved form. In FIG. 12, conversion diagrams are plotted with respect to catalytic nets which have been impregnated one and four times, respectively. As is obvious from the Figure, increased content of a catalytically active material results in a strong activity increase in the kinetically controlled area. A better low temperature activity is imparted to the catalyzer which is desirable in low temperature applications. In the mass transport dominated area the significance of the degree of coating is only marginal, which means that it is possible to restrict the catalyzer's content of active material in high temperature applications. The Example shows how it is also feasible to increase catalyzer activity by increasing the content of active material in the catalyzer, which leads to more favorable effects in the kinetically dominated area.

EXAMPLE 9

In this Example, three catalytically active nets were placed in series in the free board space of the fluid bed reactor according to the description above. Since the temperature in this space normally is high, the catalytic purification processes become mass transport dominant. That is why this Example was carried out with the most simple catalyzer design, which is alternative 2 according to Example 7. The catalytically active nets, thus, comprised directly impregnated ceramic layers without any surface area enlargement. The nets had a diameter of 200 mm which meant that the flow load, under the prevailing process conditions, amounted to 1000 m³/h, m² (NTP). The gas outlets were positioned such that it was possible to discharge flue gases both before and after the catalytically coated nets. During testing, biomass underwent combustion in a catalytically fluidized bed, the bed temperature amounting to approximately 700° C. (150% of air in excess). The temperature in the catalytically active nets rose slowly during the test and reached its operational temperature in the range of 500–700° C. after about 20 minutes. The flue gases' average content of carbon monoxide before the catalytic nets amounted to approximately 1500 ppm when stationary conditions had been measured. The equivalent value amounted to 270 ppm in the position after the catalytic nets. While the flow load was relatively high, the catalyzer relatively inactive and the number of nets in series low, a purification degree of more than 80% with regard to carbon monoxide was achieved. Complementary computations show that the degree of purification could even be higher than 95% provided a correctly dimensioned catalyzer was used, based on catalytically active nets in series.

Figure 13:
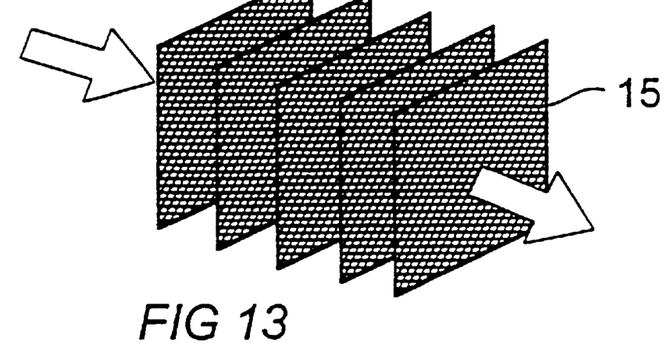
FIG. 13 is a perspective view which schematically shows an embodiment of the device according to the invention.
Figure 14:
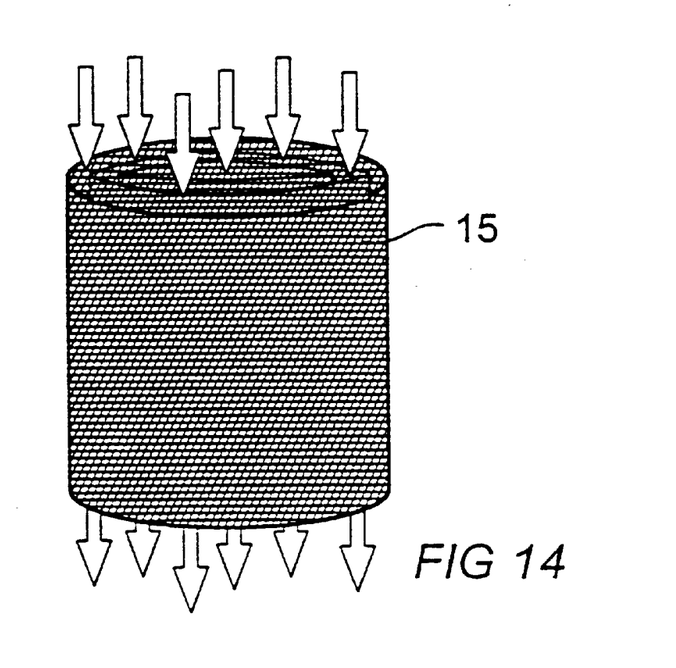
FIG. 14 is a perspective view which schematically shows an alternate embodiment of the device according to the invention.
Figure 15:
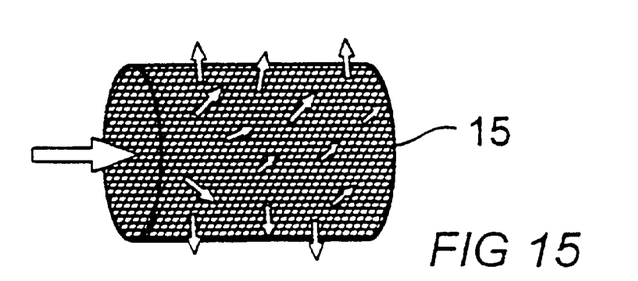
FIG. 15 is a perspective view which schematically shows yet another alternate embodiment of the device according to the invention.

FIGS. 13–15 schematically illustrates some different, practical designs of a device according to the invention. In FIG. 13, the catalyzer comprises several rectangular nets 15, which are arranged in series. The flow of the gases which are to undergo a given chemical reaction are, in this design, directed through the nets 15. In other designs the flow is directed along the nets. The nets 15 may be completely flat, or creased in various ways. The number and shape of the nets are selected in accordance with, among other things, what chemical reaction is to take place, desirable yield, and available space for the catalyzer.

In FIG. 14, several nets 15 are designed as concentric cylinders and the flow is directed along the envelope surfaces of the cylinders.

In the design according to FIG. 15 the catalyzer comprises a cylindrical net 15. The cylinder composed of the net has an open end and a closed end. The flow runs in through the open end and radially out through the cylinder envelope surface.

In yet other designs, not shown herein, the catalyzer comprises conformed nets. The structural assembly of nets allows for yet other geometrical configurations. Other factors may also have influence on the choice of configuration.

I claim:

1. A method of making a catalyzer for chemical reactions comprising the steps of:
   providing a high-temperature stable net;
   mixing a combustible pore forming substance and a porous ceramic material to form a mixture and thermally spraying said mixture on to said net to coat said net with a porous ceramic material containing macro pores;
   depositing a high specific surface area material into said macro pores for surface area enlarging the ceramic layer; and
   applying a catalytically active material to the surface area enlarged ceramic layer.

2. The method according to claim 1 wherein the combustible pore-forming substance comprises a volume fraction of up to 40% of said mixture and said pore forming substance being selected from the group consisting of a polymer, vegetable material and graphite.

3. The method according to claim 1 wherein the thermal spraying process is selected from one or more methods selected from the group consisting of flame spraying, air plasma spraying, high-velocity spraying, detonation spraying, corona brushing, protective gas plasma spraying, vacuum plasma spraying, Chemical Vapor Deposition (CVD) and laser-based methods for coating of surfaces.

4. The method according to claim 1 wherein said high specific surface area material is a substance selected from the group consisting of alumina, zirconia, titanium dioxide, silica, tungsten carbides, silicon nitrides, ceramics and mixtures thereof.

5. The method according to claim 1 wherein in said depositing step said high specific surface area material is precipitated in said macro pores of the spray-formed layer by means of a chemical wetting process.

6. The method according to claim 5 wherein said chemical wetting process comprises a treatment using a sol solution.

7. The method according to claim 5 wherein said chemical wetting process comprises an in-situ process for precipitation of said high specific surface material including drying and calcination procedures.

8. The method according to claim 1 wherein the surface area enlarged ceramic layer is coated with a catalytically active material through an impregnation process, said catalytically active material being selected from the group consisting of precious metals, metal oxides and mixtures thereof.

9. The method according to claim 1 wherein the porous ceramic layer is formed by thermal spraying to a thickness in the range of 0.01–1.0 mm.

10. The method according to claim 1 wherein the porous ceramic layer is formed by thermal spraying to a thickness in the range of 0.1–0.5 mm.

11. A method of making a catalyzer for chemical reactions comprising the steps of:
    providing a high-temperature stable net;
    injecting a porous ceramic material of high surface area particles into a jet spray of the porous ceramic material during a thermal spraying process so that said high specific surface area particles are built into the porous ceramic material to form a surface area enlarged ceramic layer; and
    applying a catalytically active material to the surface area enlarged ceramic layer.

12. The method according to claim 11 wherein the porous ceramic material of high specific surface area particles is selected from the group consisting of a high-surface-area modification of alumina, silica, titanium dioxide, zirconia, aluminum-titanium, silicon carbide and mixtures thereof.

13. The method according to claim 11 wherein the thermal spraying process is selected from the group consisting of: flame spraying, air plasma spraying, high-velocity spraying, detonation spraying, corona brushing, protective gas plasma spraying, vacuum plasma spraying, Chemical Vapor Deposition (CVD) and laser-based methods for coating of surfaces.

14. The method according to claim 11 wherein the ceramic layer comprises a substance selected from the group consisting of alumina, zirconia, titanium dioxide, silica, tungsten carbides, silicon nitrides, and mixtures thereof.

15. The method according to claim 11 wherein the surface area enlarged ceramic layer is coated with a catalytically active material through an impregnation process, said catalytically active material being selected from the group consisting of precious metals, metal oxides and mixtures thereof.

16. The method according to claim 11 wherein the porous ceramic layer is formed by thermal spraying to a thickness in the range of 0.01–1.0 mm.

17. The method according to claim 11 wherein the porous ceramic layer is formed by thermal spraying to a thickness in the range of 0.1–0.5 mm.

18. A catalyzer for chemical reactions comprising:
    a carrier substrate in the form of a plurality of nets;
    a porous ceramic layer coated on each of said nets through a thermal spraying process, said porous ceramic layer having a pore structure of macro pores;
    a surface area enlarging ceramic material deposited in said macro pores for forming a surface area enlarged ceramic layer; and
    catalytically active material applied into the surface area enlarged ceramic layer,
    wherein said active material is selected from the group consisting of precious metals, metal oxides and mixtures thereof.

19. The catalyzer according to claim 18 wherein each net is formed of a metal wire and has a wire mesh and a wire diameter corresponding to 4–60 meshes per inch according to the Tayler scale.

20. The catalyzer according to claim 18 wherein each net is formed of a metal wire and has a wire mesh and a wire diameter corresponding to 8–24 meshes per inch.

21. The catalyzer according to claim 18 wherein the catalytically active nets are arranged in series.

22. The catalyzer according to claim 18 wherein the catalytically active nets are arranged in series of 3 to 7 catalytically active nets.

23. The catalyzer according to claim 18 wherein each of the catalytically active nets is in the form of a concentric cylinder.

24. The catalyzer according to claim 18 wherein each catalytically active net is creased.

25. A method for cleaning gases with a catalyzer, said catalyzer comprising:
 a porous ceramic layer deposited on a net, wherein the porous ceramic layer contains macropores resulting from the thermal spraying of a mixture of a combustible pore forming substance and a porous ceramic material onto said net;
 a surface area enlarging ceramic material deposited in said macro pores to form a surface area enlarged ceramic layer;
 and a catalytically active material is applied onto the surface area enlarged ceramic layer, said active material being selected from the group consisting of precious metals, metal oxides and mixtures thereof, wherein the method comprises the step of:
  bringing gases to be cleaned into contact with said catalyzer.

26. The method of claim 25 wherein said active material is palladium.

27. The method according to claim 25 wherein the active material is a precious metal.

28. The method according to claim 25 further comprising the step of:
 bringing gases which are to be cleaned through one or more of the nets.

29. The method according to claim 25 wherein the gases are brought into contact with the catalyzer along with oxidation agents.

30. The method according to claim 25 further comprising the step of:
 bringing ventilation air containing solvent residues into contact with the catalyzer, to be catalytically cleaned of solvent residues.

31. The method according to claim 25 including the step of bringing gases to be cleaned comprising odoriferous substances into contact with the catalyzer.

32. The method as claimed in claim 25 wherein the gases comprise carbon monoxide and hydrocarbons.

33. The method as claimed in claim 25 wherein the gases comprise a mixture of ammonia and air to produce nitrogen monoxide and further comprising the steps of oxidizing said nitrogen mono-oxide and dissolving said oxidized nitrogen mono-oxide in water for the production of nitric acid.

34. The method according to claim 25 in that the flow load of the gases is about 100–1000 $m^3/h$.

35. A method for cleaning gases with a catalyzer, said catalyzer comprising:
 a high surface area porous ceramic layer deposited on a net, resulting from the thermal spraying of a porous ceramic material onto said net and the injection of high surface area ceramic particles into the jet spray of the porous ceramic material during the thermal spraying process;
 and a catalytically active material is applied onto high surface area ceramic layer, said catalytically active material being selected from the group consisting of precious metals, metal oxides and mixtures thereof, wherein the method comprises the step of:
  bringing gases to be cleaned into contact with said catalyzer.

36. The method of claim 35 wherein said catalytically active material is palladium.

37. The method according to claim 35 wherein the gases are brought into contact with the catalyzer along with oxidation agents.

38. The method according to claim 35 further comprising the step of:
 bringing ventilation air containing solvent residues into contact with the catalyzer to be catalytically cleaned of solvent residues.

39. The method according to claim 35 including the step of bringing gases to be cleaned comprising odoriferous substances into contact with the catalyzer.

40. The method as claimed in claim 35 wherein the gases comprise carbon monoxide and hydrocarbons.

41. The method as claimed in claim 35 wherein the gases comprise a mixture of ammonia and air to produce nitrogen monoxide and further comprising the steps of oxidizing said nitrogen mono-oxide and dissolving said oxidized nitrogen mono-oxide in water for the production of nitric acid.

42. The method according to claim 35 in that the flow load of the gases is about 100–1000 $m^3/h$.

* * * * *